(12) United States Patent
Schmidt et al.

(10) Patent No.: US 8,385,024 B2
(45) Date of Patent: Feb. 26, 2013

(54) TOLERANCE RING WITH EDGE BUMP DIFFERENCE

(75) Inventors: Ryan John Schmidt, Santa Barbara, CA (US); Kevin Patrick Hanrahan, Santa Barbara, CA (US); Damon Douglas Brink, Ventura, CA (US); David Django Dexter, Goleta, CA (US); Philippe Jacques Parsy, Rancho Santa Margarita, CA (US)

(73) Assignee: IntriPlex Technologies, Santa Barbara, CA (US)

( * ) Notice: Subject to any disclaimer, the term of this patent is extended or adjusted under 35 U.S.C. 154(b) by 245 days.

(21) Appl. No.: 12/900,352

(22) Filed: Oct. 7, 2010

(65) Prior Publication Data

US 2012/0087044 A1   Apr. 12, 2012

(51) Int. Cl.
  *G11B 5/55* (2006.01)
  *G11B 21/08* (2006.01)
  *B25G 3/20* (2006.01)
  *F16B 2/00* (2006.01)
(52) U.S. Cl. .................................... 360/265.6; 403/371
(58) Field of Classification Search ............... 360/265.2, 360/265, 265.6, 264.1, 264, 260, 240; 403/372, 403/371, 367
See application file for complete search history.

(56) References Cited

U.S. PATENT DOCUMENTS

| | | | | |
|---|---|---|---|---|
| 2008/0043374 A1* | 2/2008 | Hanrahan et al. | .......... | 360/265.6 |
| 2008/0043375 A1* | 2/2008 | Hanrahan et al. | .......... | 360/265.6 |
| 2008/0049362 A1* | 2/2008 | Hanrahan et al. | .......... | 360/256.2 |
| 2011/0076096 A1* | 3/2011 | Slayne et al. | .................. | 403/372 |
| 2012/0087044 A1* | 4/2012 | Schmidt et al. | ............ | 360/265.6 |

* cited by examiner

*Primary Examiner* — Julie Anne Watko
(74) *Attorney, Agent, or Firm* — Barcelo, Harrison & Walker LLP

(57) ABSTRACT

A novel tolerance ring includes a hollow cylindrical body defining a longitudinal axis that passes axially through its center. A circumferential gap divides the hollow cylindrical body so that the hollow cylindrical body includes first and second longitudinal edges that define the circumferential gap. A plurality of bumps protrude radially from the hollow cylindrical body, and consists of a plurality of gap-adjacent bumps and a plurality of non-gap-adjacent bumps. At least one of the plurality of bumps is circumferentially between the gap and each of the non-gap-adjacent bumps. None of the plurality of bumps is circumferentially between the gap and each of the gap-adjacent bumps. The tolerance ring includes a means for increasing an otherwise lower average radial compressive stiffness of the gap-adjacent bumps to become substantially equal to an average radial stiffness of the non-gap-adjacent bumps.

4 Claims, 9 Drawing Sheets

TOLERANCE RING WITH EDGE BUMP DIFFERENCE

FIELD OF THE INVENTION

The present invention relates generally to tolerance rings, and in particular to methods to enhance the performance of tolerance rings.

BACKGROUND

Tolerance rings are used in various assembly applications, such as in hard disk drives. Hard disk drives typically include a base and a rotary actuator that is attached to the base and that rotates through a fixed angular range. The rotary actuator positions one or more read heads relative to data tracks on a spinning magnetic disk. To facilitate angular rotation, the rotary actuator typically includes a bore into which a pivot bearing cartridge is inserted and affixed. The rotary actuator typically comprises aluminum or an alloy thereof, although alloys of magnesium and beryllium also have been used for this purpose, and the pivot bearing cartridge is typically a stainless steel component, although other materials such as ceramics have been proposed.

There are various methods in the art to attach the pivot bearing cartridge into the actuator bore. For example, the pivot bearing cartridge may be affixed within the actuator bore by an adhesive or by use of a snap ring or C-clip. Another way of affixing the pivot bearing cartridge within the actuator bore is to take up the radial space or tolerance between the pivot bearing cartridge and the actuator bore with a resilient tolerance ring (also known as an interference band). The tolerance ring undergoes incomplete radial compression between the pivot bearing cartridge and the actuator bore so as to provide a residual radial preload force between the two components that practically affixes one to the other.

However, in order to achieve higher data capacities in disk drives, the track density (typically expressed in data tracks per inch) on magnetic disks has been increased. This increase has made it more challenging to control the actuator so as to quickly and precisely position the read head(s) over desired data tracks. In certain disk drives that employ tolerance rings to affix the pivot bearing within the actuator bore, the actuator rotational friction within its limited angular range may be undesirably non-uniform. Disk drives that employ tolerance rings may also suffer from poor pivot bearing cartridge centering within the actuator bore and/or undesirable dynamic resonance characteristics of the actuator assembly. Such issues may exacerbate the difficulty in quickly and precisely controlling the actuator. Hence, there is a need in the art for a tolerance ring that may improve the performance of modern hard disk drive devices and/or other precision devices.

SUMMARY

A novel tolerance ring includes a hollow cylindrical body defining a longitudinal axis that passes axially through its center. A circumferential gap divides the hollow cylindrical body so that the hollow cylindrical body includes first and second longitudinal edges that define the circumferential gap. A plurality of bumps protrude radially from the hollow cylindrical body, and no bump that protrudes radially from the hollow cylindrical body is excluded from the plurality of bumps. The plurality of bumps consists of a plurality of gap-adjacent bumps and a plurality of non-gap-adjacent bumps. At least one of the plurality of bumps is circumferentially between the gap and each of the non-gap-adjacent bumps. None of the plurality of bumps is circumferentially between the gap and each of the gap-adjacent bumps. The tolerance ring includes a means for increasing an otherwise lower average radial compressive stiffness of the gap-adjacent bumps to become substantially equal to an average radial stiffness of the non-gap-adjacent bumps.

DESCRIPTION OF EXAMPLE EMBODIMENTS

Figure 1:
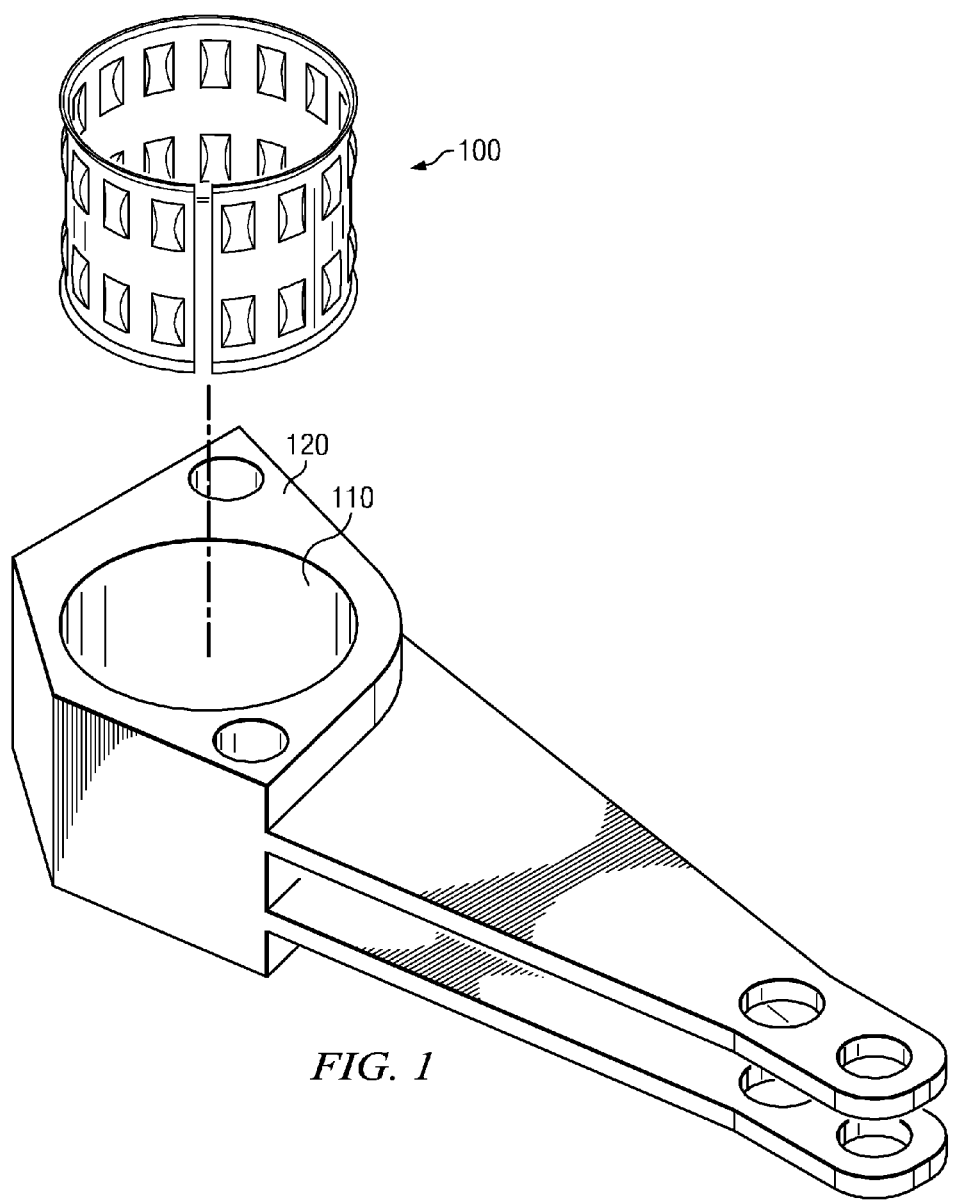
FIG. 1 is a perspective view of a tolerance ring exploded from a bore in an actuator body.

FIG. 1 is a perspective view of a tolerance ring 100 exploded from an actuator bore 110 in an actuator body 120. The actuator body 120 may be a sub-component of a hard disk drive, for example. The actuator bore 110 may be sized to accommodate a pivot bearing cartridge (not shown in the view of FIG. 1) and the tolerance ring 100, with the tolerance ring 100 being radially preloaded between the bore 110 and the pivot bearing cartridge to secure the pivot bearing cartridge within the bore.

Figure 2:
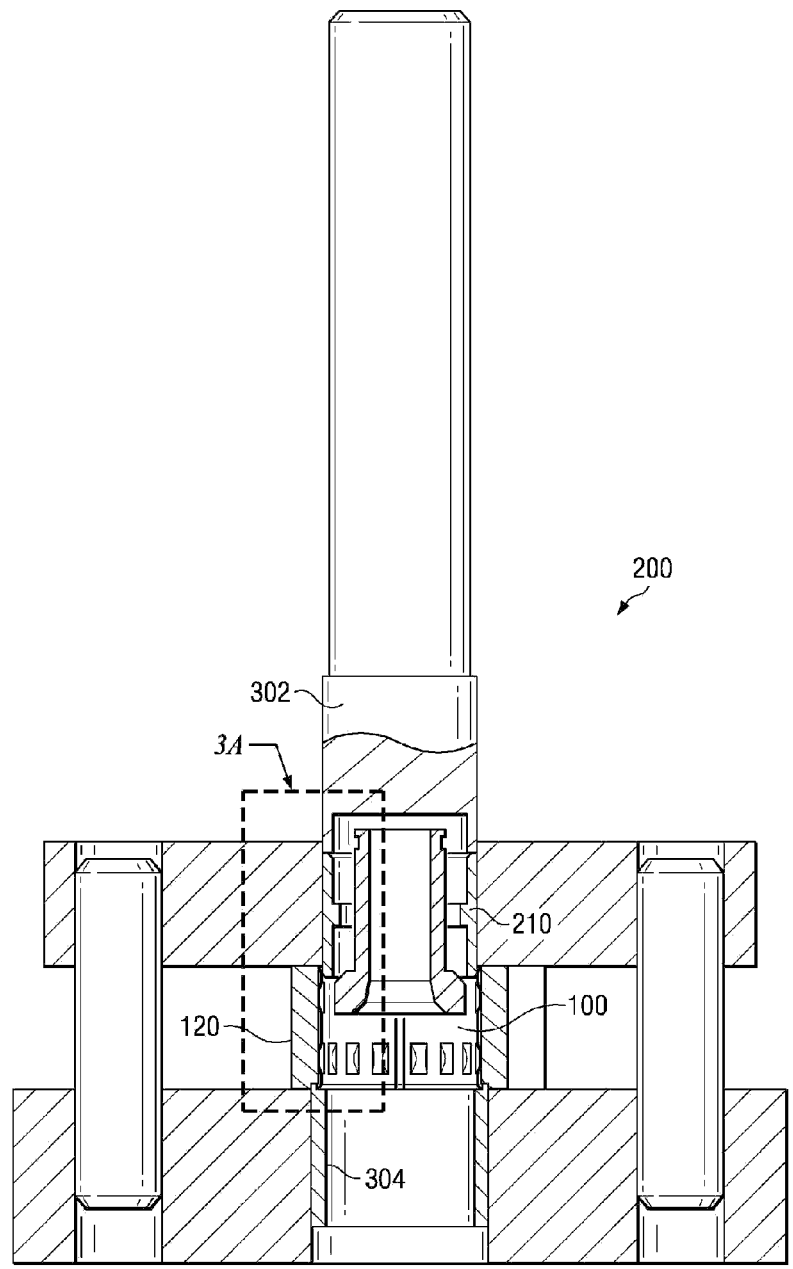
FIG. 2 is a cross-sectional view of a tool for pressing a tolerance ring and pivot bearing cartridge into a bore in an actuator body.
Figure 3A:
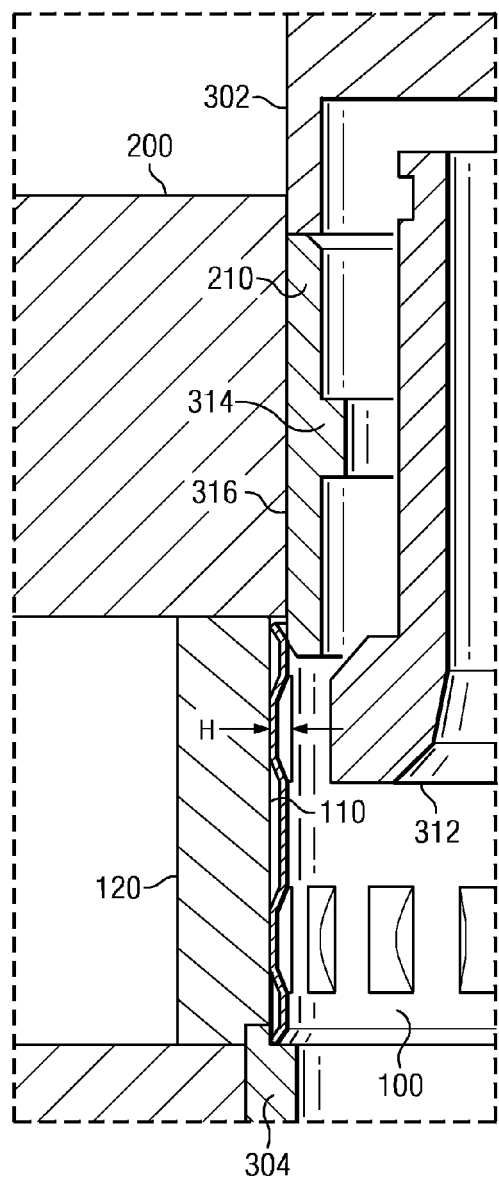
FIG. 3A is a zoomed in view of a portion of the cross-sectional view of FIG. 2.

FIG. 2 is a cross-sectional view of a tool 200 for pressing (vertically, in the view of FIG. 2) a tolerance ring 100 and pivot bearing cartridge 210 into a bore in an actuator body 120. FIG. 3A is a zoomed in view of a portion of the cross-sectional view of FIG. 2. Now referring additionally to FIGS. 2 and 3A, the tool 200 includes a plunger 302 for pushing (downward in the view of FIG. 3A) upon the pivot bearing cartridge 210. The pivot bearing cartridge 210 includes an outer cylinder 314 that rotates about a center shaft 312. The tolerance ring 100 is sized such that, with sufficient radial deformation of its bumps, the tolerance ring 100 can fit within the actuator bore 110 of the actuator body 120 and also receive and contact the outer surface 316 of the outer cylinder 314 of the pivot bearing cartridge 210. The bumps of tolerance ring 100 have an average undeformed radial bump height that is depicted in FIG. 3A as "H."

FIG. 3A depicts the pivot bearing cartridge 210 just as it is beginning to be pushed into the actuator bore 110 (that has already received the tolerance ring 100). The plunger 302 pushes axially against the outer cylinder 314 to insert the pivot bearing cartridge 210. The outer surface 316 of the outer cylinder 314 will contact and radially compress the tolerance ring 100 as the pivot bearing cartridge 210 is pushed into the actuator bore 110. The tool 200 includes an axial stop 304 that prevents the tolerance ring 100 from sliding axially, and instead forces compression radially of tolerance ring 100 to accommodate the insertion of the pivot bearing cartridge 210. Alternatively, the pivot bearing cartridge 210 and the tolerance ring 100 may be pushed together into the actuator bore 110 (that has not already received the tolerance ring 100)

Figure 3B:
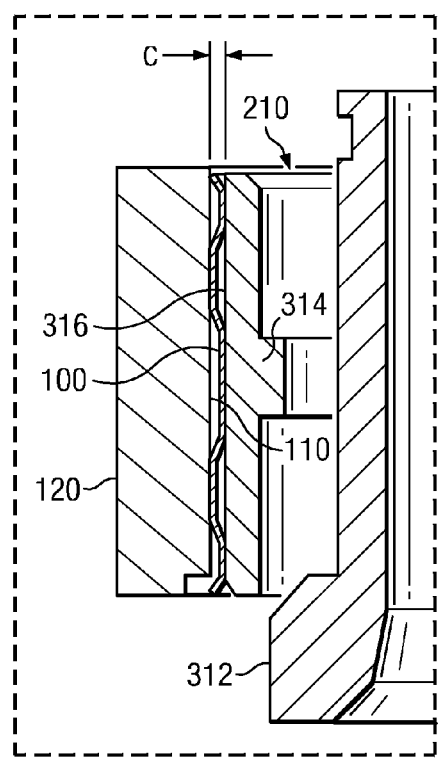
FIG. 3B is a cross-sectional view of a tolerance ring in place after installation between a pivot bearing cartridge and an actuator bore.

FIG. 3B is a cross-sectional view of a tolerance ring 100 in place after its installation between the outer cylinder 314 of a pivot bearing cartridge 210 and an actuator bore 110 of an actuator body 120. Now referring additionally to FIG. 3B, the radial clearance between the outer surface 316 of the outer cylinder 314 of the pivot bearing cartridge 210, and the actuator bore 110 of the actuator body 120, is depicted as "C." After assembly, the bumps of the tolerance ring 100 are radially compressed because the radial clearance C is designed to be less than the average undeformed radial bump height H. Of course, after assembly, the bumps are deformed so that their average deformed radial bump height is approximately equal to the clearance C, and the tolerance ring 100 exerts a radial "preload" between the outer cylinder 314 and the actuator body 120 that serves to retain the pivot bearing cartridge 210 within the actuator bore 110.

Figure 4B:
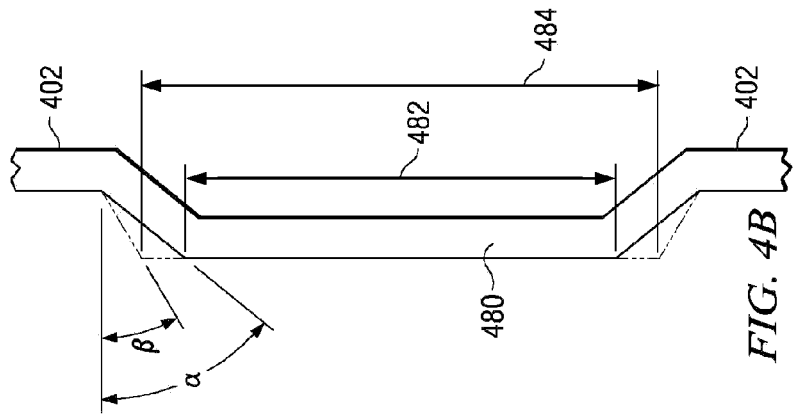
FIG. 4B depicts a radial cross-section of a portion of a tolerance ring according to an embodiment of the present invention.
Figure 4A:
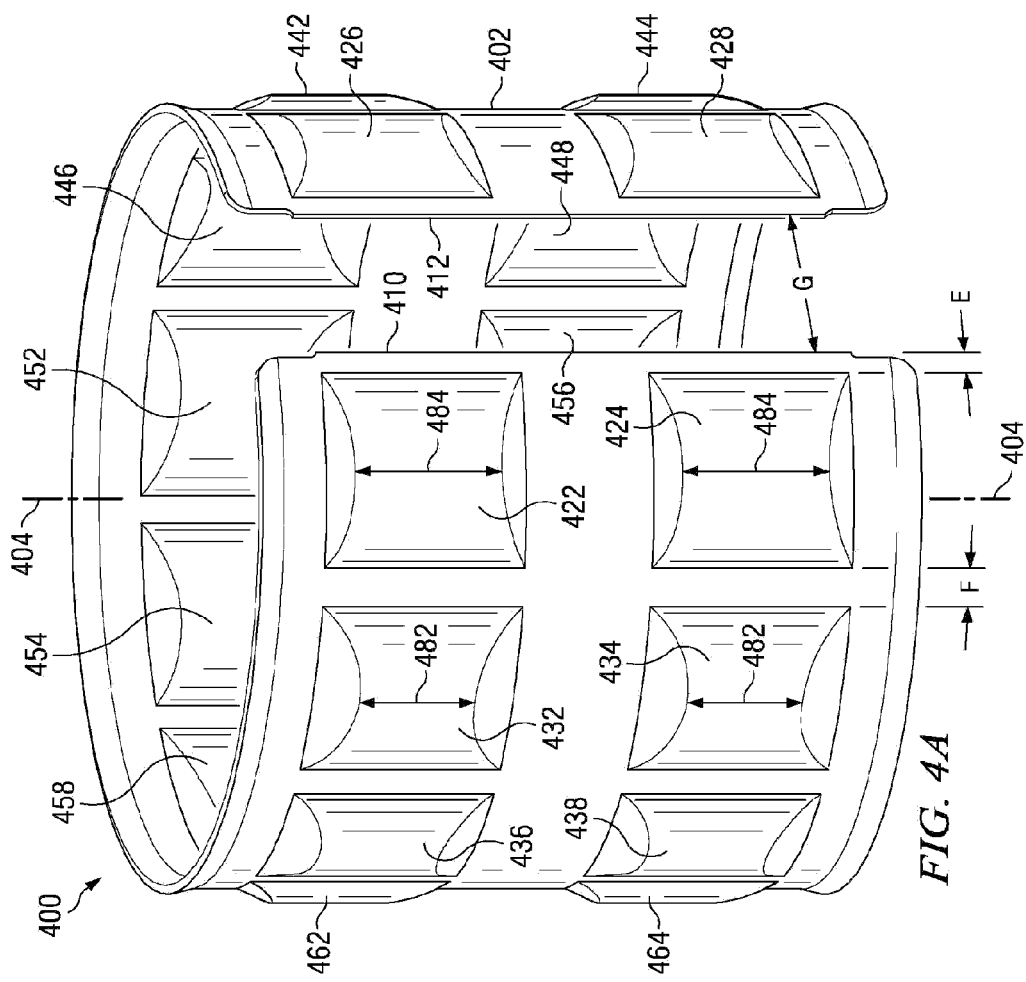
FIG. 4A is a perspective view of a tolerance ring according to an embodiment of the present invention.

FIG. 4A is a perspective view of a tolerance ring 400 according to an embodiment of the present invention. The tolerance ring 400 includes a hollow cylindrical body 402 defining a longitudinal axis 404 that passes axially through its center. A circumferential gap (having a circumferential gap extent "G") divides the hollow cylindrical body 402 so that the hollow cylindrical body 402 includes first and second longitudinal edges 410, 412 that define the circumferential gap. Each of the first and second longitudinal edges 410, 412 defines a longitudinal edge length that is measured approximately parallel to the longitudinal axis 404. The first and second longitudinal edges 410, 412 are separated circumferentially from each other by the circumferential gap extent G. Preferably, the circumferential gap extent G is substantially less than the longitudinal edge length. For example, in FIG. 4A the circumferential gap has a slender aspect ratio such that its circumferential extent G is preferably no more than $\frac{1}{3}^{rd}$ its longitudinal extent (which is approximately equal to the length of the first or second longitudinal edge 410, 412).

A plurality of bumps 422, 424, 426, 428, 432, 434, 436, 438, 442, 444, 446, 448, 452, 454, 456, 458, 462, 464 protrude radially from the hollow cylindrical body 402. Specifically, the plurality of bumps consists of a plurality of gap-adjacent bumps 422, 424, 426, 428 and a plurality of non-gap-adjacent bumps 432, 434, 436, 438, 442, 444, 446, 448, 452, 454, 456, 458, 462, 464. As depicted in FIG. 4A, at least one of the plurality of bumps is disposed circumferentially between the gap and each of the non-gap-adjacent bumps, while none of the plurality of bumps is disposed circumferentially between the gap and each of the gap-adjacent bumps. As shown in FIG. 4A, the average circumferential distance "E," between the gap-adjacent bumps 422, 424, 426, 428 and the circumferential gap, optionally may be less than the average circumferential distance "F" between bumps.

FIG. 4B depicts a radial cross-section of a portion of a tolerance ring according to an embodiment of the present invention. For example, each of the plurality of bumps 422, 424, 426, 428, 432, 434, 436, 438, 442, 444, 446, 448, 452, 454, 456, 458, 462, 464 in FIG. 4A defines a bump cross-sectional profile along a radial cross-section that may be described by FIG. 4B. In this context, a "radial cross-section" may be any cross-section cut by an imaginary knife that is oriented radially with respect to the longitudinal axis 404 as it cuts, whether the knife moves parallel to the longitudinal axis 404 or moves normal to the longitudinal axis 404.

As can be seen in FIG. 4B, the bump cross-sectional profile includes a central plateau 480 of approximately constant radial protrusion from the hollow cylindrical body 402. For example, in certain embodiments an approximately constant radial protrusion may correspond to a radial protrusion variation that is less than ±20 microns, which is about ±6% of a 0.0125 inch bump height. In the embodiment of FIG. 4B, an average span 484 of the central plateaus 480 of the gap-adjacent bumps 422, 424, 426, 428 may be more than an average span 482 of the central plateaus 480 of the non-gap-adjacent bumps 432, 434, 436, 438, 442, 444, 446, 448, 452, 454, 456, 458, 462, 464. Consequently, as shown in FIG. 4B, the chamfer angle α of the non-gap adjacent bumps may not be as steep as the chamfer angle β of the gap adjacent bumps. Preferably but not necessarily, the average span 484 of the central plateaus of the gap-adjacent bumps is more than the average span 482 of the central plateaus of the non-gap-adjacent bumps by at least 50 microns. Such a dimensional inequality may serve to increase an otherwise lower average radial compressive stiffness of the gap-adjacent bumps to become substantially equal to an average radial stiffness of the non-gap-adjacent bumps.

In the embodiment of FIG. 4A, the average spans 482, 484 are oriented parallel to the longitudinal axis 404, but in certain alternative embodiments (e.g. the embodiment of FIG. 5) the average spans 482, 484 are oriented circumferentially. Specifically, in the embodiment of FIG. 4A, the bump cross-sectional profile of FIG. 4B would be oriented parallel to the longitudinal axis 404 so that the average span 484 of the central plateaus 480 of the gap-adjacent bumps 422, 424, 426, 428 is an average length of the central plateaus 480 of the gap-adjacent bumps 422, 424, 426, 428 that is measured parallel to the longitudinal axis 404. Likewise, in the embodiment of FIG. 4A, the average span 482 of the central plateaus 480 of the non-gap-adjacent bumps 432, 434, 436, 438, 442, 444, 446, 448, 452, 454, 456, 458, 462, 464 is an average length of the central plateaus 480 of the non-gap-adjacent bumps 432, 434, 436, 438, 442, 444, 446, 448, 452, 454, 456, 458, 462, 464 that is also measured parallel to the longitudinal axis 404.

Figure 5:
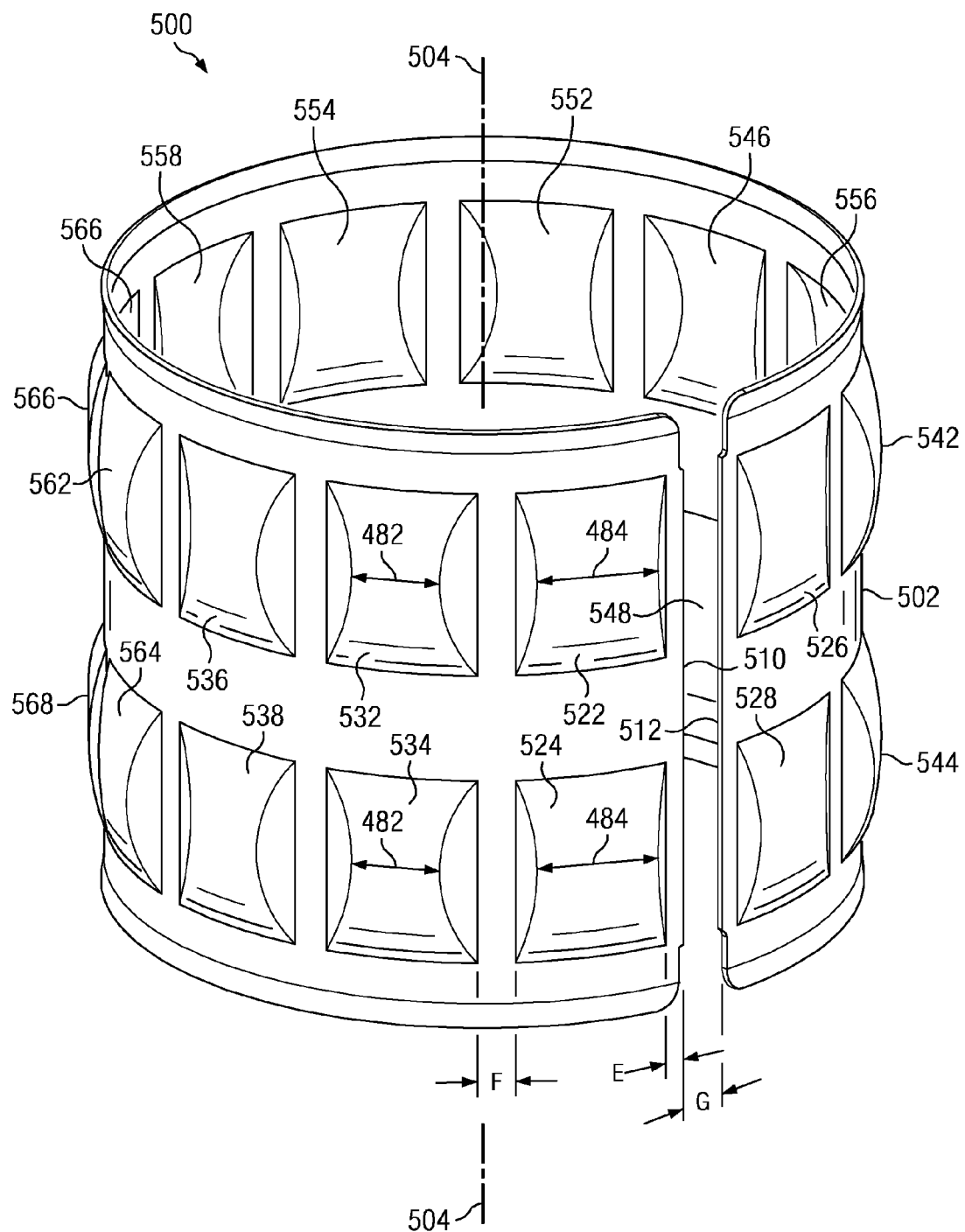
FIG. 5 is a perspective view of a tolerance ring according to another embodiment of the present invention.

FIG. 5 is a perspective view of a tolerance ring 500 according to an alternative embodiment of the present invention, in which the average spans 482, 484 are oriented circumferentially. Now referring additionally to FIG. 5, the tolerance ring 500 includes a hollow cylindrical body 502 defining a longitudinal axis 504 that passes axially through its center. A circumferential gap (having a circumferential gap extent "G") divides the hollow cylindrical body 502 so that the hollow cylindrical body 502 includes first and second longitudinal edges 510, 512 that define the circumferential gap.

In the embodiment of FIG. 5, a plurality of bumps 522, 524, 526, 528, 532, 534, 536, 538, 542, 544, 546, 548, 552, 554, 556, 558, 562, 564, 566, 568 protrude radially from the hollow cylindrical body 502. Specifically, the plurality of bumps consists of a plurality of gap-adjacent bumps 522, 524, 526, 528 and a plurality of non-gap-adjacent bumps 532, 534, 536, 538, 542, 544, 546, 548, 552, 554, 556, 558, 562, 564, 566, 568. As depicted in FIG. 5, at least one of the plurality of bumps is disposed circumferentially between the gap and each of the non-gap-adjacent bumps, while none of the plurality of bumps is disposed circumferentially between the gap and each of the gap-adjacent bumps. As shown in FIG. 5, the average circumferential distance "E," between the gap-adjacent bumps 522, 524, 526, 528 and the circumferential gap, optionally may be less than the average circumferential distance "F" between bumps.

Just as FIG. 4B may depict a radial cross-section of a portion of the tolerance ring 400 of FIG. 4A, FIG. 4B may also depict a radial cross-section of a portion of the tolerance ring 500 of FIG. 5. Specifically, each of the plurality of bumps 522, 524, 526, 528, 532, 534, 536, 538, 542, 544, 546, 548, 552, 554, 556, 558, 562, 564, 566, 568 defines a bump cross-sectional profile along a radial cross-section. As can be seen in FIG. 4B, an average span 484 of the central plateaus 480 of the gap-adjacent bumps 522, 524, 526, 528 may be more than an average span 482 of the central plateaus 480 of the non-gap-adjacent bumps 532, 534, 536, 538, 542, 544, 546, 548, 552, 554, 556, 558, 562, 564, 566, 568. Preferably but not necessarily, the average span 484 of the central plateaus of the gap-adjacent bumps is more than the average span 482 of the central plateaus of the non-gap-adjacent bumps by at least 50 microns. Such a dimensional inequality may serve to increase an otherwise lower average radial compressive stiffness of the gap-adjacent bumps to become substantially equal to an average radial stiffness of the non-gap-adjacent bumps.

In the tolerance ring embodiment of FIG. 5, the bump cross-sectional profile of FIG. 4B would be oriented circumferentially about the longitudinal axis 504 so that the average span 484 of the central plateaus 480 of the gap-adjacent bumps 522, 524, 526, 528 is an average width of the central plateaus 480 of the gap-adjacent bumps 522, 524, 526, 528 that is measured circumferentially about the longitudinal axis 504. Likewise in the embodiment of FIG. 5, the average span 482 of the central plateaus 480 of the non-gap-adjacent bumps 532, 534, 536, 538, 542, 544, 546, 548, 552, 554, 556, 558, 562, 564, 566, 568 is an average width of the central plateaus 480 of the non-gap-adjacent bumps 532, 534, 536, 538, 542, 544, 546, 548, 552, 554, 556, 558, 562, 564, 566, 568 that is also measured circumferentially about the longitudinal axis 504.

Certain other alternative embodiments may include bumps having a rounded top, for which the span of the region considered as the central plateau would be very small but non-zero (since still there is a bump center location with zero slope and about which exists a region—considered as the central plateau—where the radial protrusion would be approximately constant).

Preferably, and as shown in the figures described above, all the cross-sections and cross sectional measurements for the gap adjacent bumps are taken in the same orientation as the cross-sections and cross sectional measurements for the non-gap adjacent bumps. Likewise, and as shown in the figures described above, the cross-sections and cross sectional measurements for each gap adjacent bump are taken at the same relative location (e.g. relative to the center of that bump) as the cross-sections and cross sectional measurements for each non-gap adjacent bump (e.g. relative to its center).

In the embodiment of FIG. 4A each of the plurality of bumps 422, 424, 426, 428, 432, 434, 436, 438, 442, 444, 446, 448, 452, 454, 456, 458, 462, 464 has a radial compressive stiffness that opposes compressive deformation of that bump normal to the longitudinal axis 404. For example, the radial compressive stiffness may equal a radial compressive force applied to the bump divided by a consequent radial compressive deformation of the bump. The radial compressive stiffness may vary significantly and non-linearly with the amount of force or deformation. The radial compressive stiffness is not limited to that measured in the free state (before assembly) or in the deformed state (after assembly). Rather, the radial compressive stiffness optionally may be defined as that measured for a radial compressive force or radial compressive deformation that is significantly greater than (e.g. twice or more than) that expected to result from assembly.

In the embodiment of FIG. 4A, at some amount of compressive deformation, an average value of the radial stiffnesses of the gap adjacent bumps 422, 424, 426, 428 is preferably but not necessarily at least 5% more than an average value of the radial stiffnesses of the non-gap-adjacent bumps 432, 434, 436, 438, 442, 444, 446, 448, 452, 454, 456, 458, 462, 464. Again, in this context the radial stiffness may be defined as that measured for a radial compressive force or radial compressive deformation that is significantly greater than that expected to result from assembly. For example, because the edge condition of prior art gap adjacent bumps may unacceptably weaken them, the gap adjacent bumps of FIG. 4A may be designed to have a greater relative stiffness at a radial deformation that is 1.5 times that expected from assembly, so that they have comparable relative radial stiffness to the non-gap-adjacent bumps for the radial deformations that are expected to result from assembly.

Likewise, in the embodiment of FIG. 5, at some amount of compressive deformation, an average value of the radial stiffnesses of the gap adjacent bumps 522, 524, 526, 528 is preferably but not necessarily more than (and most preferably at least 0.4 N/µm more than) an average value of the radial stiffnesses of the non-gap-adjacent bumps 532, 534, 536, 538, 542, 544, 546, 548, 552, 554, 556, 558, 562, 564, 566, 568.

Figure 6:
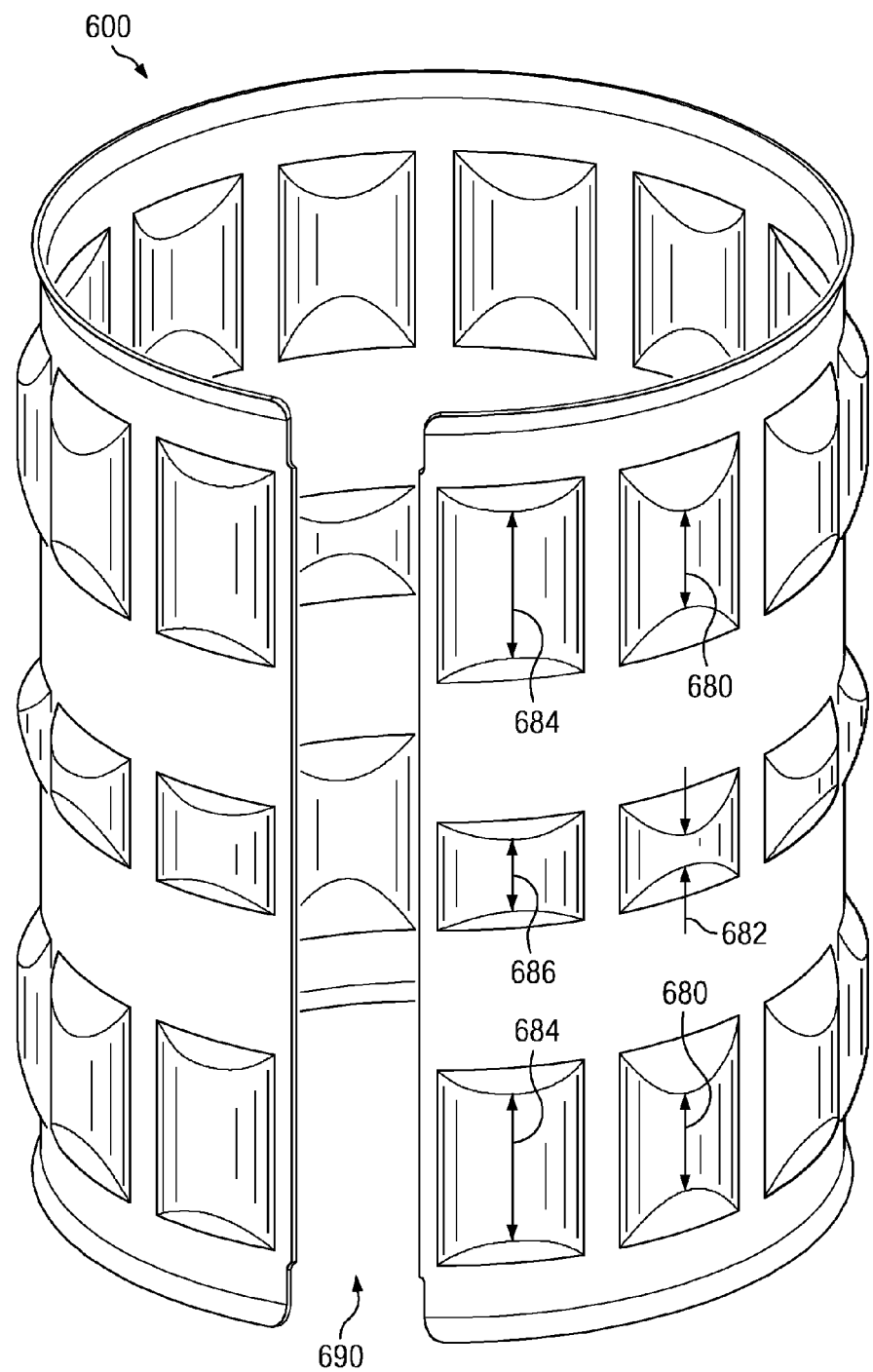
FIG. 6 is a perspective view of a tolerance ring according to another embodiment of the present invention.

FIG. 6 is a perspective view of a tolerance ring 600 according to another embodiment of the present invention. In the embodiment of FIG. 6, if the two columns of gap-adjacent bumps are similar to each other, then the average span of the central plateaus of the gap-adjacent bumps equals the average for one like column=(span 684+span 686+span 684)/3. In the embodiment of FIG. 6, if the eleven columns of non-gap-adjacent bumps are similar to each other, then the average span of the central plateaus of the non-gap-adjacent bumps equals the average for one like column=(span 680+span 682+span 680)/3. Hence, it can be seen from FIG. 6 that for the tolerance ring 600 the average span of the central plateaus of the gap-adjacent bumps is greater than the average span of the central plateaus of the non-gap-adjacent bumps, that is: (span 684+span 686+span 684)/3>(span 680+span 682+span 680)/3.

Moreover, preferably but not necessarily, the average span of the central plateaus of the gap-adjacent bumps of tolerance ring 600 is more than the average span of the central plateaus of the non-gap-adjacent bumps by at least 50 microns. Such dimensional inequalities may serve to increase an otherwise lower average radial compressive stiffness of the gap-adjacent bumps of tolerance ring 600 (e.g. lower because of the different boundary conditions due to the existence of the circumferential gap 690), to become substantially equal to an average radial stiffness of the non-gap-adjacent bumps.

Figure 7:
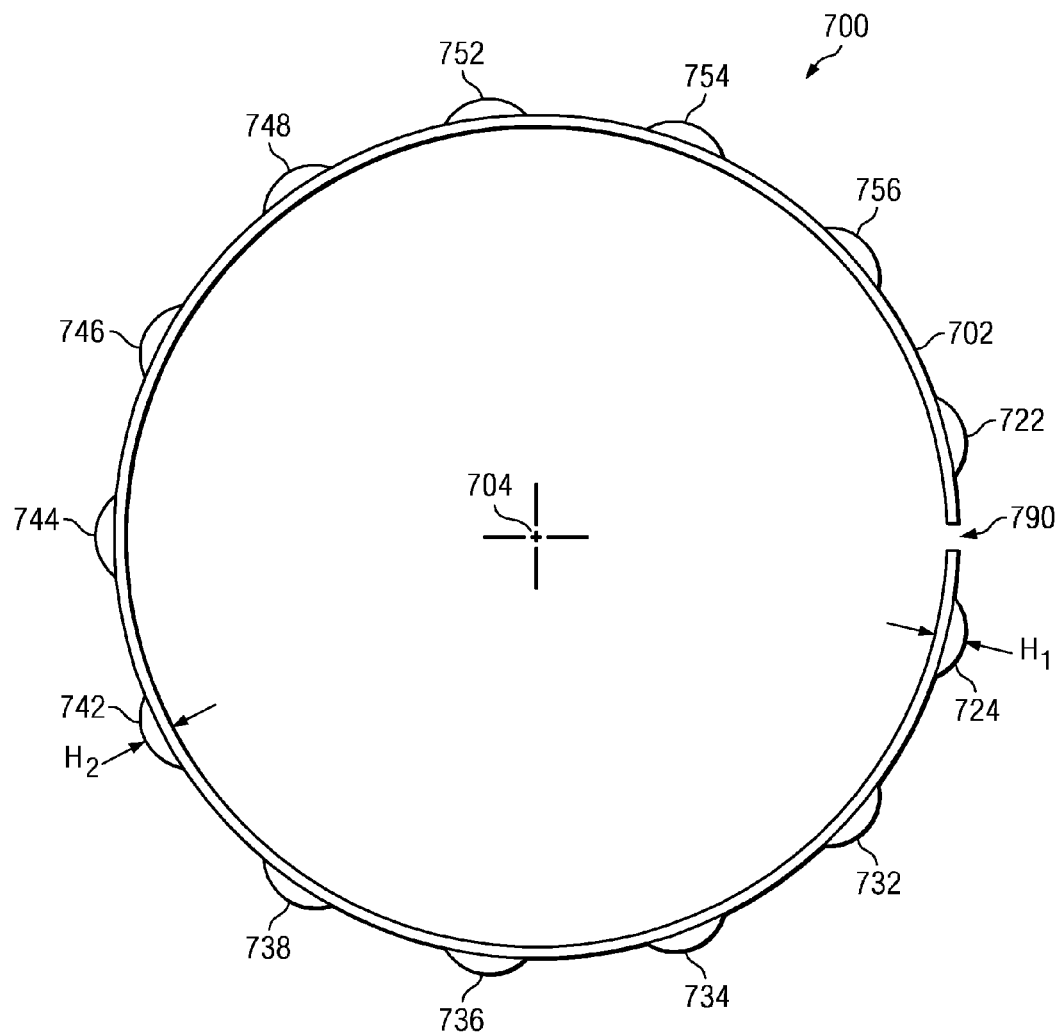
FIG. 7 is a top view of a tolerance ring according to another embodiment of the present invention.

FIG. 7 is a top view of a tolerance ring 700 according to another embodiment of the present invention. In the embodiment of FIG. 700 each of the plurality of bumps 722, 724, 732, 734, 736, 738, 742, 744, 746, 748, 752, 754, 756 defines a maximum bump height measured away from the hollow cylindrical body 702 and radially with respect to the longitudinal axis 704 (note that the longitudinal axis 704 is oriented out of the page in the view of FIG. 7), with the bump in an undeformed state. In the embodiment of FIG. 7, the average bump height $H_2$ of the non-gap-adjacent bumps 732, 734, 736, 738, 742, 744, 746, 748, 752, 754, 756, may be less than an average bump height $H_1$ of the gap-adjacent bumps 722, 724, preferably by at least 20 microns. Such dimensional inequalities may serve to increase an otherwise lower average radial compressive stiffness of the gap-adjacent bumps 722, 724 (e.g. lower because of the different boundary conditions due to the existence of the circumferential gap 790), to become substantially equal to an average radial stiffness of the non-gap-adjacent bumps 732, 734, 736, 738, 742, 744, 746, 748, 752, 754, 756.

Figure 8:
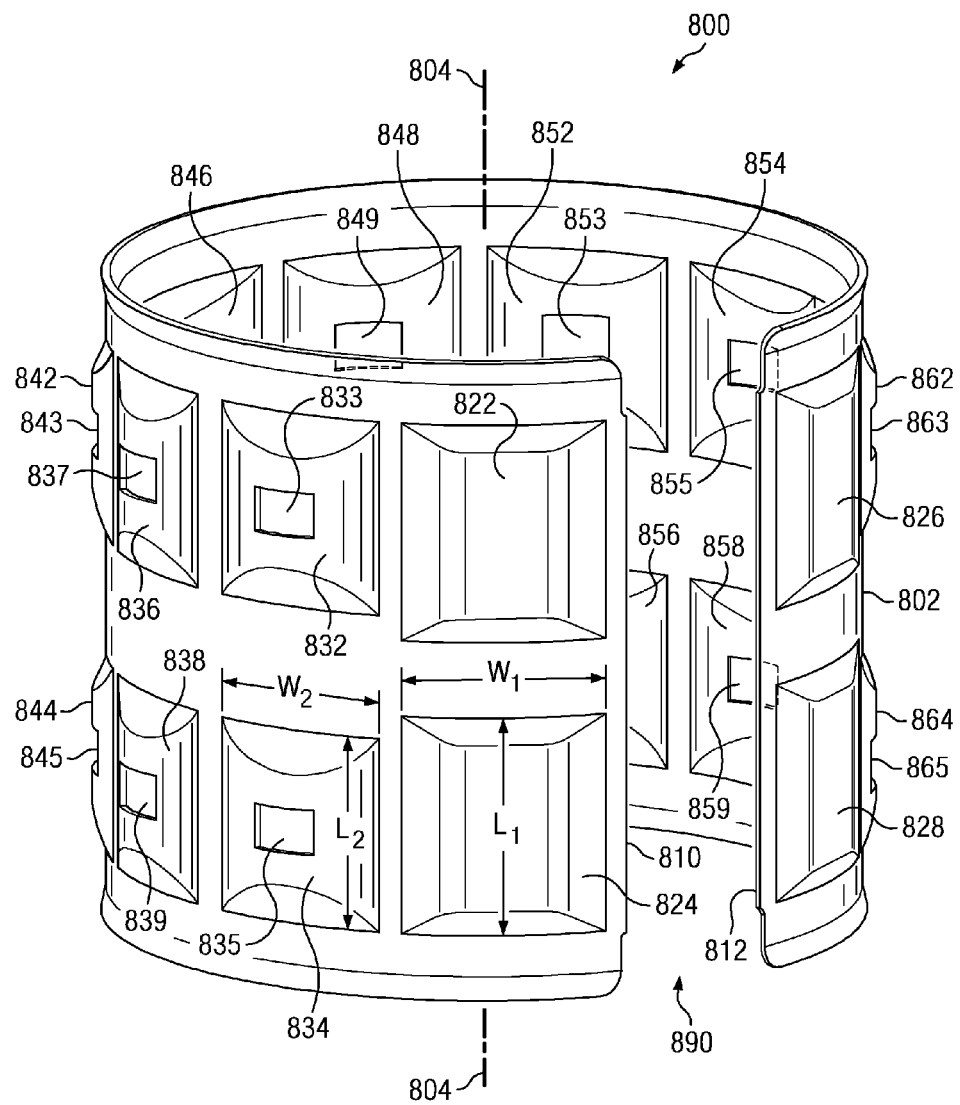
FIG. 8 is a perspective view of a tolerance ring according to another embodiment of the present invention.

FIG. 8 is a perspective view of a tolerance ring 800 according to another embodiment of the present invention. The tolerance ring 800 includes a hollow cylindrical body 802 defining a longitudinal axis 804 that passes axially through its center. A circumferential gap 890 divides the hollow cylindrical body 802 so that the hollow cylindrical body 802 includes first and second longitudinal edges 810, 812 that define the circumferential gap 890. A plurality of bumps 822, 824, 826, 828, 832, 834, 836, 838, 842, 844, 846, 848, 852, 854, 856, 858, 862, 864 protrude radially from the hollow cylindrical body 802. Specifically, the plurality of bumps consists of a plurality of gap-adjacent bumps 822, 824, 826, 828 and a plurality of non-gap-adjacent bumps 832, 834, 836, 838, 842, 844, 846, 848, 852, 854, 856, 858, 862, 864. Note that there is at least one of the plurality of bumps disposed circumferentially between the gap 890 and each of the non-gap-adjacent bumps, while none of the plurality of bumps is disposed circumferentially between the gap 890 and each of the gap-adjacent bumps.

In the embodiment of FIG. 8, each of the plurality of bumps 822, 824, 826, 828, 832, 834, 836, 838, 842, 844, 846, 848, 852, 854, 856, 858, 862, 864 defines a total bump span $W_1$, $W_2$, $L_1$, or $L_2$, measured from where protrusion from the hollow cylindrical body 802 begins to where such protrusion ends. For example, the total bump spans $L_1$, $L_2$, are total bump lengths measured parallel to the longitudinal axis 804 from where protrusion from the hollow cylindrical body 802 begins to where such protrusion ends. Also for example, the total bump spans $W_1$, $W_2$ are total bump widths measured circumferentially about the longitudinal axis 804 from where protrusion from the hollow cylindrical body 802 begins to where such protrusion ends.

In the embodiment of FIG. 8, the average total bump spans $W_1$, $L_1$ of the gap-adjacent bumps 822, 824, 826, 828 may be different from the average total bump spans $W_2$, $L_2$ of the non-gap-adjacent bumps 832, 834, 836, 838, 842, 844, 846, 848, 852, 854, 856, 858, 862, 864. Alternatively, the average total bump spans $W_1$, $L_1$ of the gap-adjacent bumps 822, 824, 826, 828 may be approximately equal to the average total bump spans $W_2$, $L_2$ of the non-gap-adjacent bumps 832, 834, 836, 838, 842, 844, 846, 848, 852, 854, 856, 858, 862, 864.

In either case, a ratio of the average span of the central plateaus of the gap-adjacent bumps 822, 824, 826, 828 to an average total bump span of the gap-adjacent bumps 822, 824, 826, 828 is preferably (but not necessarily) more than a ratio of the average span of the central plateaus of the non-gap-adjacent bumps 832, 834, 836, 838, 842, 844, 846, 848, 852, 854, 856, 858, 862, 864 to an average total bump span of the non-gap-adjacent bumps 832, 834, 836, 838, 842, 844, 846, 848, 852, 854, 856, 858, 862, 864. In certain embodiments, this inequality of ratios may serve to increase an otherwise lower average radial compressive stiffness of the gap-adjacent bumps 822, 824, 826, 828 (e.g. lower because of the different boundary conditions due to the existence of the circumferential gap 890), to become substantially equal to an average radial stiffness of the non-gap-adjacent bumps 832, 834, 836, 838, 842, 844, 846, 848, 852, 854, 856, 858, 862, 864.

In the embodiment of FIG. 8, the plurality of non-gap-adjacent bumps 832, 834, 836, 838, 842, 844, 846, 848, 852, 854, 856, 858, 862, 864 optionally comprises a plurality of cut-out bumps 832, 834, 836, 838, 842, 844, 848, 852, 854, 858, 862, 864. Each of the plurality of cut-out bumps 832, 834, 836, 838, 842, 844, 848, 852, 854, 858, 862, 864 includes an opening 833, 835, 837, 839, 843, 845, 849, 853, 855, 859, 863, 865, respectively, extending through the tolerance ring 800. In certain embodiments, such openings through the non-gap adjacent bumps may serve to decrease their average radial compressive stiffness to become substantially equal to the average radial stiffness of the gap-adjacent bumps 822, 824, 826, 828 (e.g. which otherwise may have a lower average radial compressive stiffness because of different boundary conditions from the circumferential gap 890). Preferably but not necessarily, the edges of the openings 833, 835, 837, 839, 843, 845, 849, 853, 855, 859, 863, 865 may be slightly inwardly curled, for example during a forming step of tolerance ring fabrication, to reduce debris generation during subsequent assembly (e.g. to reduce debris from possible scraping along the interior of the actuator bore 110 upon insertion of the tolerance ring 800).

Figure 9:
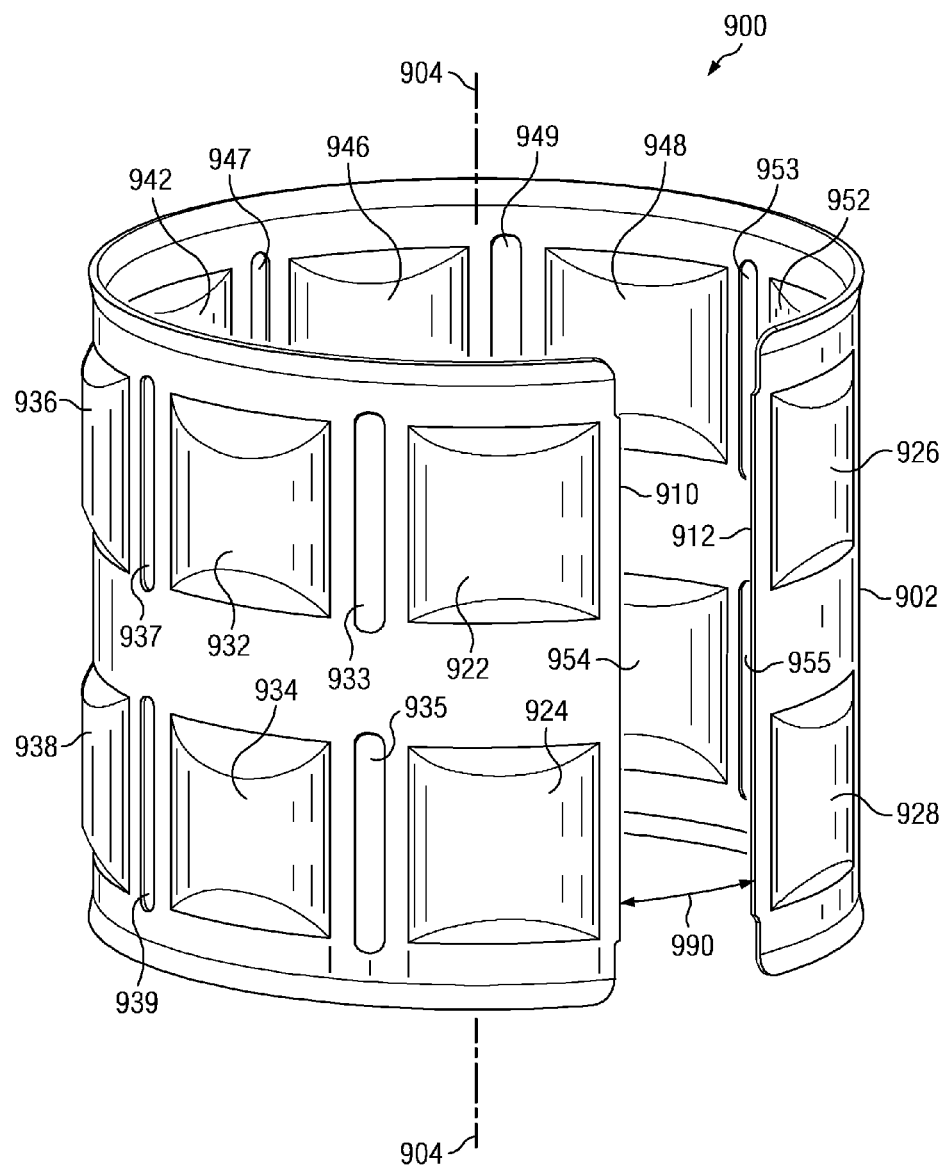
FIG. 9 is a perspective view of a tolerance ring according to another embodiment of the present invention.

FIG. 9 is a perspective view of a tolerance ring 900 according to another embodiment of the present invention. The tolerance ring 900 includes a hollow cylindrical body 902 defining a longitudinal axis 904 that passes axially through its center. A circumferential gap 990 divides the hollow cylindrical body 902 so that the hollow cylindrical body 902 includes first and second longitudinal edges 910, 912 that define the circumferential gap 990. A plurality of bumps 922, 924, 926, 928, 932, 934, 936, 938, 942, 944, 946, 948, 952, 954 protrude radially from the hollow cylindrical body 902. Specifically, the plurality of bumps consists of a plurality of gap-adjacent bumps 922, 924, 926, 928 and a plurality of non-gap-adjacent bumps 932, 934, 936, 938, 942, 944, 946, 948, 952, 954. Note that there is at least one of the plurality of bumps disposed circumferentially between the gap 990 and each of the non-gap-adjacent bumps, while none of the plurality of bumps is disposed circumferentially between the gap 990 and each of the gap-adjacent bumps.

The embodiment of FIG. 9 also includes a plurality of openings 933, 935, 937, 939, 947, 949, 953, 955 through the hollow cylindrical body 902 of the tolerance ring 900. Each of the plurality of openings 933, 935, 937, 939, 947, 949, 953, 955 is disposed between two of the plurality of bumps 922, 924, 926, 928, 932, 934, 936, 938, 942, 944, 946, 948, 952, 954. In the embodiment of FIG. 9, each of the plurality of openings 933, 935, 937, 939, 947, 949, 953, 955 optionally takes the form of a through slot that is oriented parallel to the longitudinal axis 904.

The plurality of openings 933, 935, 937, 939, 947, 949, 953, 955 may serve to decrease the average radial compressive stiffness of the plurality of non-gap-adjacent bumps 932, 934, 936, 938, 942, 944, 946, 948, 952, 954 to become substantially equal to the average radial stiffness of the gap-adjacent bumps 922, 924, 926, 928. The plurality of openings may accomplish this by changing the boundary conditions of the non-gap-adjacent bumps to be more like the boundary conditions of the gap-adjacent bumps. That is, the plurality of openings 933, 935, 937, 939, 947, 949, 953, 955 may create free edges near the non-gap adjacent bumps that have similar structural effect as the free edges 910 and 912 (existing because of the circumferential gap 990). Otherwise, the gap-adjacent bumps may have an undesirably lower average radial compressive stiffness relative to the non-gap-adjacent bumps, because the free edges 910 and 912 (existing because of the circumferential gap 990) may affect the boundary conditions of the gap-adjacent bumps much more than the non-gap-adjacent bumps.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

We claim:

1. A tolerance ring comprising:
   a hollow cylindrical body defining a longitudinal axis that passes axially through its center;
   a circumferential gap that divides the hollow cylindrical body so that the hollow cylindrical body includes first and second longitudinal edges that define the circumferential gap;
   a plurality of bumps that protrude radially from the hollow cylindrical body; and
   a plurality of openings extending through the tolerance ring;
   wherein there is no bump that protrudes radially from the hollow cylindrical body that is not included in the plurality of bumps, and the plurality of bumps consists of a plurality of gap-adjacent bumps and a plurality of non-gap-adjacent bumps, there being at least one of the plurality of bumps circumferentially between the gap and each of the non-gap-adjacent bumps, there being none of the plurality of bumps circumferentially between the gap and each of the gap-adjacent bumps; and
   wherein each of the plurality of openings extends through a corresponding one of the non-gap-adjacent bumps.

2. The tolerance ring of claim 1 wherein at least two of the gap-adjacent bumps do not include any hole therethrough.

3. The tolerance ring of claim 1 wherein at least one gap-adjacent bump includes a hole therethrough, but said hole is smaller than any of the plurality of openings.

4. The tolerance ring of claim 1 wherein each of the plurality of bumps has a radial compressive stiffness that opposes compressive deformation of that bump normal to the longitudinal axis, and wherein an average value of the radial stiffnesses of all of the gap adjacent bumps is greater than an average value of the radial stiffnesses of all of the non-gap-adjacent bumps.

* * * * *